(12) United States Patent
Williams et al.

(10) Patent No.: US 8,338,354 B2
(45) Date of Patent: *Dec. 25, 2012

(54) MANUAL SPRAY CLEANER AND PROTECTANTS

(75) Inventors: Jesse J. Williams, Zeeland, MI (US); Eric J. Hansen, Ada, MI (US); Lindsay M. Ulman, Rockford, MI (US)

(73) Assignee: BISSELL Homecare, Inc., Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/033,228

(22) Filed: Feb. 23, 2011

(65) Prior Publication Data

US 2011/0139180 A1 Jun. 16, 2011

Related U.S. Application Data

(62) Division of application No. 10/604,780, filed on Aug. 15, 2003, now Pat. No. 7,906,473.

(60) Provisional application No. 60/319,548, filed on Sep. 13, 2002, provisional application No. 60/320,145, filed on Apr. 25, 2003.

(51) Int. Cl.
*C11D 17/04* (2006.01)
*C11D 3/39* (2006.01)
*C11D 3/395* (2006.01)
*C11D 3/37* (2006.01)

(52) U.S. Cl. ........ 510/277; 510/278; 510/279; 510/309; 510/375; 510/400; 510/406; 510/475

(58) Field of Classification Search .................. 510/277, 510/278, 279, 303, 309, 375, 406, 400, 475
See application file for complete search history.

(56) References Cited

U.S. PATENT DOCUMENTS

| 2,941,696 | A | | 6/1960 | Homm |
|---|---|---|---|---|
| 3,236,418 | A | | 2/1966 | Dalle et al. |
| 3,236,457 | A | | 2/1966 | Kennedy et al. |
| 3,303,970 | A | | 2/1967 | Breslau et al. |
| 3,416,709 | A | | 12/1968 | Shultz et al. |
| 3,451,593 | A | | 6/1969 | Dillarstone |
| 3,488,287 | A | * | 1/1970 | Seglin et al. .......... 424/44 |
| 3,521,792 | A | | 7/1970 | Davidson |
| 3,575,319 | A | | 4/1971 | Safianoff |
| 3,613,956 | A | | 10/1971 | McCulloch |

(Continued)

FOREIGN PATENT DOCUMENTS

DE 19504502 8/1996

(Continued)

*Primary Examiner* — Lorna M Douyon
(74) *Attorney, Agent, or Firm* — McGarry Bair PC

(57) ABSTRACT

A manual spray cleaner for removing dirt and stains from fabrics and carpets comprising a spray bottle having two separate chambers and a single dispensing spray outlet for dispensing controlled amounts of liquids from each of the chambers. One of the chambers has a fabric/carpet cleaning composition therein and the other chamber has an oxidizing composition that enhances the cleanability of the fabric/carpet cleaning composition. The fabric/carpet cleaning composition and the oxidizing composition are simultaneously drawn from their respective chambers and mixed together at the time that they are dispensed from the spray bottle. At least one of the oxidizing composition and the fabric/carpet cleaning composition includes a fabric/carpet protectant. The two compositions are mixed before or after they are sprayed from the bottle. The two compositions can be pressurized with an aerosol propellant or drawn from their respective chambers by a mechanical pump.

12 Claims, 7 Drawing Sheets

U.S. PATENT DOCUMENTS

| | | | |
|---|---|---|---|
| 3,635,372 A | | 1/1972 | Van Dyck et al. |
| 3,638,786 A | | 2/1972 | Borecki et al. |
| 3,655,436 A | * | 4/1972 | Dupre .......................... 427/352 |
| 3,693,837 A | | 9/1972 | Yuhas |
| 3,722,752 A | * | 3/1973 | Kenkare et al. ............ 222/145.1 |
| 3,722,753 A | | 3/1973 | Miles |
| 3,731,847 A | | 5/1973 | Webster |
| 3,748,268 A | * | 7/1973 | Ludas ................................. 8/142 |
| 3,819,524 A | | 6/1974 | Schubert et al. |
| 3,866,800 A | | 2/1975 | Schmitt |
| 3,970,219 A | | 7/1976 | Spitzer et al. |
| 3,970,584 A | | 7/1976 | Hart et al. |
| 4,014,806 A | * | 3/1977 | Connor et al. ................. 510/429 |
| 4,019,657 A | | 4/1977 | Spitzer et al. |
| 4,359,545 A | * | 11/1982 | Ona et al. ...................... 252/8.61 |
| 4,439,416 A | * | 3/1984 | Cordon et al. ................... 424/47 |
| 4,687,663 A | | 8/1987 | Schaeffer |
| 4,773,562 A | | 9/1988 | Gueret |
| 4,792,062 A | | 12/1988 | Goncalves |
| 4,839,081 A | | 6/1989 | Church et al. |
| 4,904,405 A | * | 2/1990 | Kajihara et al. ............... 510/406 |
| 4,923,631 A | * | 5/1990 | Sims et al. ................ 252/186.42 |
| 4,963,352 A | * | 10/1990 | Roberts ............................ 424/73 |
| 5,004,557 A | * | 4/1991 | Nagarajan et al. ............ 510/337 |
| 5,005,736 A | | 4/1991 | Portas |
| 5,009,342 A | | 4/1991 | Lawrence et al. |
| 5,215,675 A | | 6/1993 | Wilkins et al. |
| 5,332,157 A | | 7/1994 | Proctor |
| 5,398,846 A | | 3/1995 | Corba et al. |
| 5,421,492 A | | 6/1995 | Barger et al. |
| 5,439,610 A | | 8/1995 | Ryan et al. |
| 5,472,119 A | | 12/1995 | Park et al. |
| 5,672,651 A | * | 9/1997 | Smith ............................ 524/590 |
| 5,767,055 A | | 6/1998 | Choy et al. |
| 5,869,440 A | | 2/1999 | Kobyashi et al. |
| 5,872,111 A | * | 2/1999 | Au et al. .......................... 514/62 |
| 5,888,290 A | | 3/1999 | Engle et al. |
| 5,921,447 A | | 7/1999 | Barger et al. |
| 5,925,608 A | | 7/1999 | Spruyt et al. |
| 5,928,384 A | | 7/1999 | Scialla et al. |
| 5,948,480 A | | 9/1999 | Murphy |
| 6,021,926 A | | 2/2000 | Lauwers et al. |
| 6,043,209 A | | 3/2000 | Micciche et al. |
| 6,131,237 A | | 10/2000 | Kasper et al. |
| RE36,982 E | | 12/2000 | Melikyan et al. |
| 6,177,395 B1 | | 1/2001 | Silvaggi et al. |
| 6,187,738 B1 | | 2/2001 | Micciche et al. |
| 6,214,784 B1 | | 4/2001 | Robbins et al. |
| 6,223,942 B1 | | 5/2001 | Markey et al. |
| 6,306,219 B1 | * | 10/2001 | Ofosu-Asante et al. .......... 134/1 |
| 6,308,863 B1 | | 10/2001 | Harman |
| 6,316,399 B1 | | 11/2001 | Melikyan et al. |
| 6,531,437 B1 | | 3/2003 | Ryan et al. |
| 6,583,103 B1 | | 6/2003 | Klinkhammer |
| 6,824,623 B1 | | 11/2004 | Gross et al. |
| 7,021,499 B2 | * | 4/2006 | Hansen et al. ............. 222/145.5 |
| 2003/0026775 A1 | * | 2/2003 | Marchesi et al. ................ 424/73 |
| 2003/0073602 A1 | | 4/2003 | Ramirez, Jr. et al. |
| 2003/0119697 A1 | * | 6/2003 | Ozaki et al. ................... 510/302 |

FOREIGN PATENT DOCUMENTS

| | | |
|---|---|---|
| EP | 0269068 | 6/1988 |
| JP | 63045045 A | 2/1988 |
| JP | 4235295 A | 8/1992 |
| JP | 6247482 A | 9/1994 |
| WO | WO 95/16023 A1 * | 6/1995 |
| WO | 9804666 | 5/1998 |
| WO | WO 01/00765 * | 1/2001 |
| WO | 0283828 A1 | 10/2002 |
| WO | 2004009753 A1 | 1/2004 |

* cited by examiner

MANUAL SPRAY CLEANER AND PROTECTANTS

CROSS REFERENCE TO RELATED APPLICATIONS

This application is a divisional of U.S. application Ser. No. 10/604,780, filed Aug. 15, 2003, now U.S. Pat. No. 7,906,473, which claims the benefit of U.S. Provisional Application Ser. No. 60/320,145, filed Apr. 25, 2003, entitled "Manual Spray Cleaner and Protectants" and U.S. Provisional Application Ser. No. 60/319,548, filed Sep. 13, 2002, entitled "Manual Spray Cleaner and Protectants". Additional related applications include U.S. application Ser. No. 10/711,488, filed Sep. 21, 2004, now U.S. Pat. No. 7,021,499, issued Apr. 4, 2006, and U.S. application Ser. No. 13/110,512, filed May 18, 2011, both of which are continuations of U.S. application Ser. No. 10/604,780, filed Aug. 15, 2003, and U.S. application Ser. No. 12/345,892, filed Dec. 30, 2008, now U.S. Pat. No. 7,967,220, issued Jun. 28, 2011, which is a continuation-in-part of U.S. application Ser. No. 10/604,780, filed Aug. 15, 2003.

BACKGROUND OF THE INVENTION

1. Field of the Invention

This invention relates to carpet and fabric cleaners. In one of its aspects, the invention relates to a manual spray cleaner composition. In another of its aspects, the invention relates to a system for cleaning and protecting carpets and fabrics. In yet another of its aspects, the invention relates to a method for cleaning fabrics and carpets. In still another of its aspects, the invention relates to a method for cleaning and protecting fabrics and carpets.

2. Description of the Related Art

The performance of cleaning compositions with an oxidizing agent deteriorates over a relatively short time if the reactive agents are stored together in a single chamber. For example, when an oxidizing agent is in a cleaning composition containing an activator, the oxidizing agent is stable for only a limited time period. Instability not only reduces the cleaning effectiveness of the composition but may also lead to increased pressure build-up causing the closed chamber to buckle or burst. As a result, various systems have been developed to separately store two-component cleaning compositions and mix the agents upon or immediately prior to application to the desired surface.

The Choy et al. U.S. Pat. No. 5,767,055 discloses an apparatus for cleaning a hard surface, such as kitchen and bathroom tile, comprising a dual chamber bottle having a spray applicator for dispensing a mixture of compositions from each of the two chambers. One of the chambers contains a builder or chelating agent composition and the other chamber includes a hypohalite or hypohalite generator such as sodium hypochlorite as a bleaching agent. The two components of the composition are mixed upon spraying onto a surface.

The Kobyashi et al. U.S. Pat. No. 5,869,440 and the Unilever PCT Publication No. WO 95/16023 both disclose two part bleaching compositions which comprise a peroxide composition and a detergent composition which are stored separately and sprayed onto hard surfaces at the time of combination.

The Van Dyck et al. U.S. Pat. No. 3,635,372 discloses a housing mounting a pair of aerosol chambers, one containing an incapacitating fluid and the other containing a gas. The aerosol chambers have output valves that are connected through tubes to an output nozzle and a whistle. A trigger is pivotally mounted to the housing and moves laterally to displace a vertically movable actuator for simultaneously opening both aerosol valves in the chambers for dispensing the fluid and gas in the chambers.

The Breslau et al. U.S. Pat. No. 3,303,970 and the Safianoff U.S. Pat. No. 3,575,319 disclose a pair of aerosol dispensing chambers having different fluids that are dispensed through outlet valves connected through tubing to a single dispensing orifice. The outlet valves are actuated simultaneously by a trigger that is pivotally mounted to a frame that holds the aerosol chambers. Rotation of the trigger forces the valves downwardly to open the valves simultaneously.

Kasper et al. U.S. Pat. No. 6,131,237 discloses a carpet extractor that has a liquid dispensing and a liquid recovery system. The liquid extraction system includes a clean water tank and a solution tank that are fluidly connected through a mixing valve for variable mixing of water with a cleaning solution. Kasper et al. '237 further discloses that an oxidizing agent, such as persalt, in conjunction with an activator such as tetra acetyl ethylene diamine (TAED), can be incorporated into the cleaning solution, either in the clean water tank, or into the cleaning solution tank. The mixture is then heated in an inline heater to raise the temperature of the detergent oxidizing agent solution into the range of 120-150° F. The oxidizing agent solution can be added to the solution tank and the cleaning solution can be added to the clean water tank. The cleaning solution and the oxidizing agent can then be mixed, heated and applied to the floor. The cleaning solution can be applied to the surface to be cleaned either through a spray nozzle or the nozzle of the accessory hose. The oxidizing agent can be used with or without the inline block heater. The oxidizing agent can be further used with or without the activating agent.

SUMMARY OF THE INVENTION

According to the invention, a kit for removing dirt and stains from fabrics and carpets comprises a cleaning composition comprising at least one polysiloxane-based anti-soil agent and at least one methacrylate-based anti-stain agent and an oxidizing composition that enhances the cleanability of the fabric/carpet cleaning composition. The kit includes a container having a first chamber and a second chamber, with the cleaning composition stored in one of the first and second chambers and the oxidizing composition stored in the other of the first and second chambers. The kit also includes a dispensing system having a single dispensing spray outlet for dispensing controlled amounts of fluids from each of the first and second chambers. The dispensing system is configured to simultaneously dispense the cleaning composition and the oxidizing composition from their respective chambers, mix the cleaning composition and the oxidizing composition together and dispense a mixture of the cleaning composition and oxidizing composition from the container.

According to another embodiment, each of the first and second chambers further comprises an aerosol propellant, an outlet with a valve assembly to control a flow of fluid through the outlet, and a dip tube connected to the valve assembly for dispensing fluid under pressure from each of the first and second chambers. One of the first and second chambers storing the oxidizing composition is formed in part by cup, and the outlet for the one of the first and second chambers is positioned in the cup. The cup is formed of at least one of aluminum, steel, and zinc-plated steel and has a coating of a material inert to a peroxide compound in the oxidizing composition.

The fabric/carpet cleaning composition preferably comprises at least one of a surfactant a fragrance, and combinations thereof. Preferably, the cleaning composition further includes a pH adjusting agent to maintain a pH in the cleaning composition between 7.5 and 12.0, in order to trigger release of oxygen in the oxidizing composition.

In one embodiment of the invention, the aerosol propellant for one of the first and second chambers storing the oxidizing composition is a fluorinated hydrocarbon. The aerosol propellant for the other of the first and second chambers storing the cleaning composition includes dimethyl ether. Further, the valves for the first and second chambers have at least one orifice.

The oxidizing composition comprises at least one of deionized water, a peroxide compound, a stabilizer, an anti-soil and/or anti-stain protectant. The oxidizing composition can comprise hydrogen peroxide. The pH of the oxidizing composition is in the range of about 1.5 to about 8.5.

In one embodiment, the oxidizing composition includes a fabric/carpet protectant. In another embodiment, the carpet cleaning composition includes a fabric/carpet protectant.

The invention provides for a compact package of an effective cleaning agent that includes an oxidizing agent that retains its effectiveness throughout its storage life and is easily delivered to a carpet or upholstery surface with a carpet cleaning solution for spot cleaning. The cleaning compositions according to the invention thus packaged can treat a wide variety of stains on carpet and fabric.

In one embodiment of the invention, the dispensing system includes at least one of aerosol propellants in each of the first and second chambers to pressurize the fluid in each of the first and second chamber and a mechanical pump for drawing fluid from each of first and second chambers for dispensing the cleaning composition and the oxidizing composition from their respective first and second chambers.

In another embodiment, the dispensing system is adapted to mix the cleaning compositions and oxidizing composition together in the single dispensing spray outlet before they are sprayed from the dispensing outlet. Alternatively, the two compositions can be mixed together at the surface of the fabric or carpet after they are sprayed from the dispensing outlet.

According to another embodiment, the cleaning composition further comprises at least one organicc solvent selected from the group consisting essentially of glycol ethers, terpenes and mixtures thereof.

BRIEF DESCRIPTION OF THE DRAWINGS

The invention will now be described with reference to the accompanying drawings in which.

DESCRIPTION OF THE PREFERRED EMBODIMENT

Figure 1:
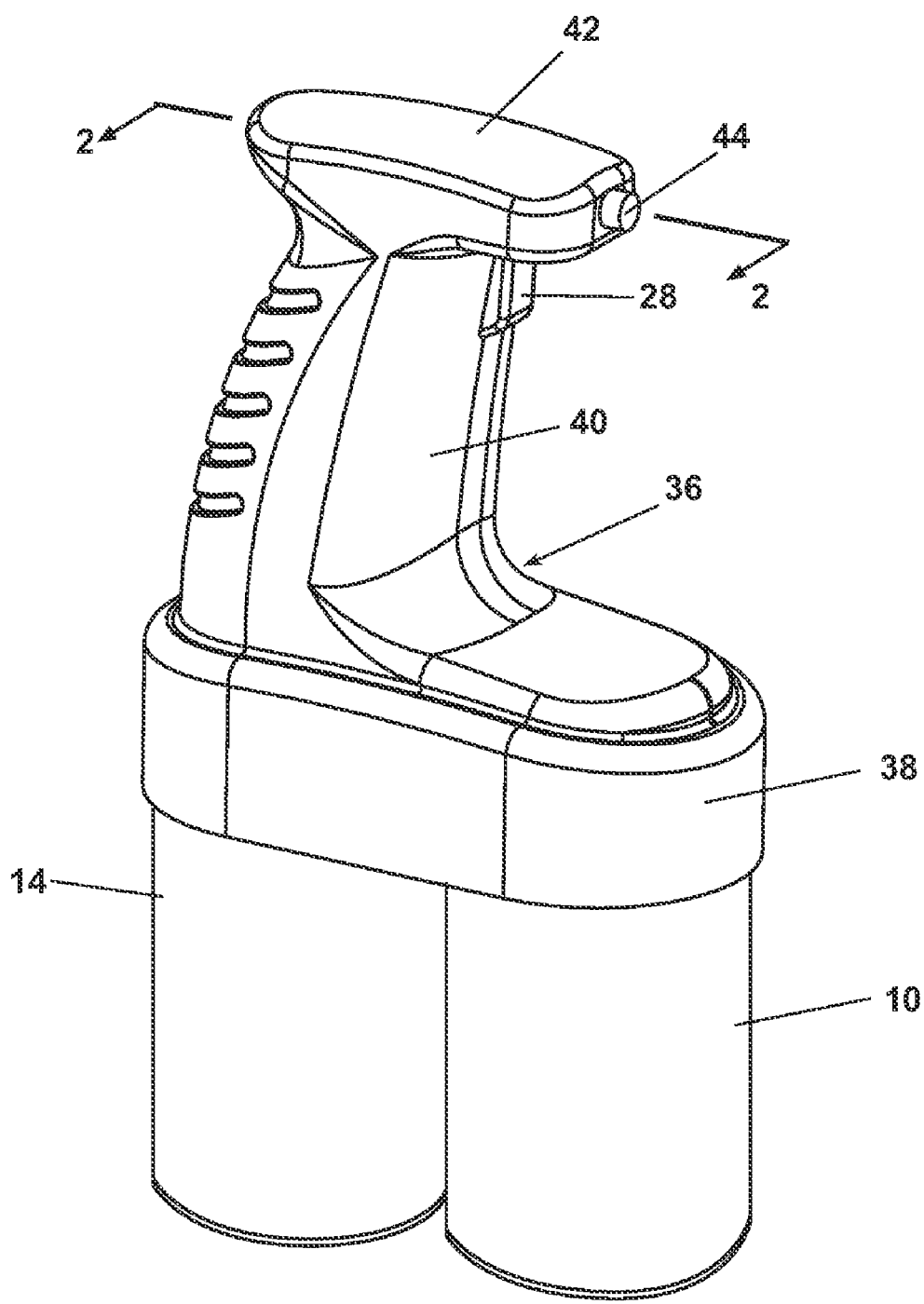
FIG. 1 is a perspective view of an aerosol dispenser according to the invention.
Figure 2:
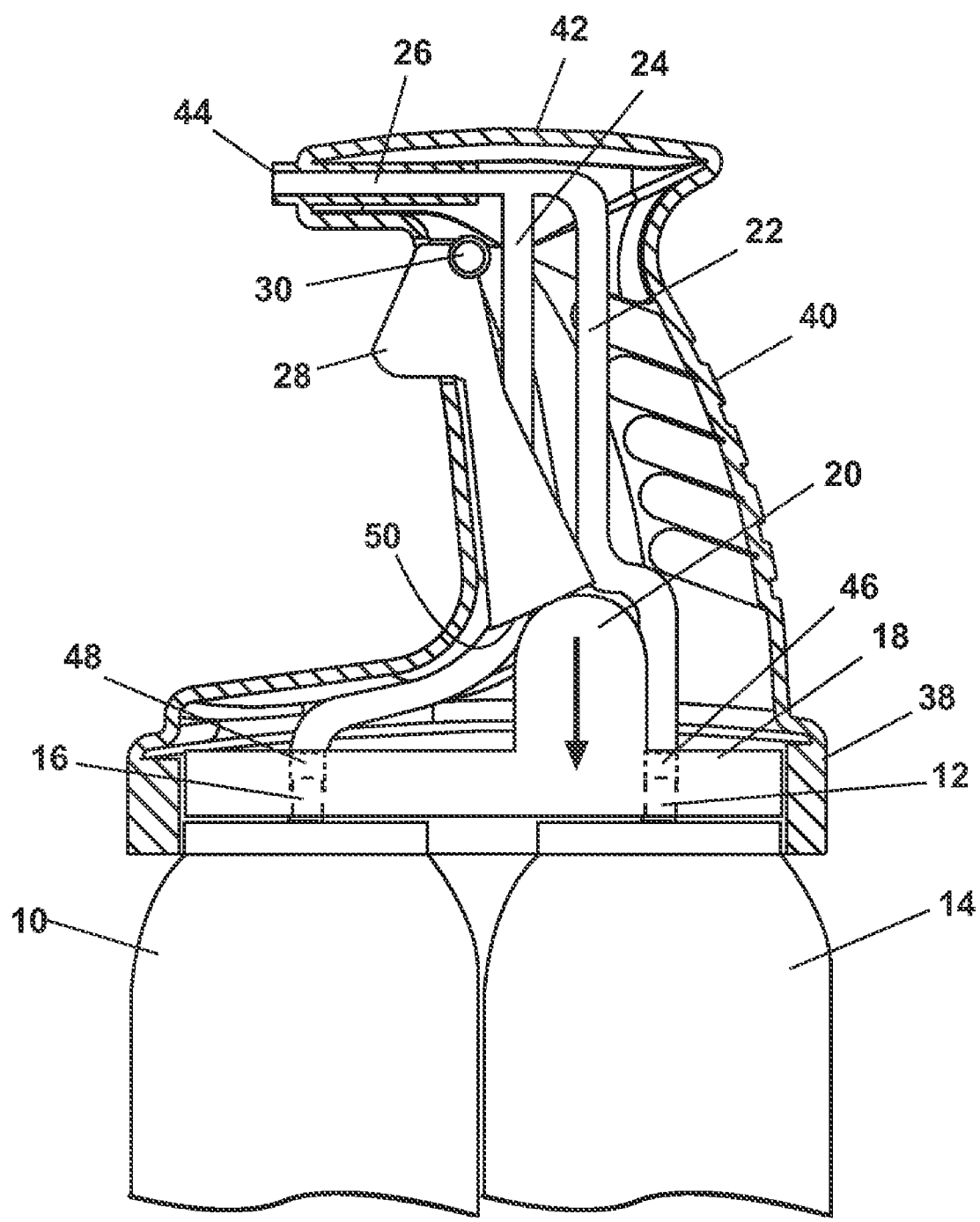
FIG. 2 is a schematic view in section of the aerosol dispenser illustrated in FIG. 1 taken along line 2-2 of FIG. 1.

Referring now to the drawings, and to FIGS. 1 and 2 in particular, there is shown an aerosol dispenser for dispensing cleaning compositions and oxidants from aerosol chambers 10 and 14, which have conventional push valves 12 and 16 with outlet openings therein. Material selection for components coming in contact with the contents of the chamber depends upon the type of aerosol propellant and composition utilized in each chamber. The preferred propellant is dimethyl ether ($C_2H_6O$, also known as DME). DME is not compatible with nylon; therefore, when DME is the propellant, polypropylene is the preferred material for push valves 12, 16. Alternative propellants can be chosen from the hydrofluorocarbon (HFC) family and particularly 1,1-difluoroethane ($CH_3CHF_2$). A suitable commercially available HFC is Dymel 152A from Dupont. When Dymel 152A is utilized, nylon is the preferred material for push valves 12, 16. A single valve orifice with a diameter in the range of 0.010 inches to 0.040 inches, and preferably 0.020 inches, is provided in each push valve 12, 16 to provide an adequate fluid flow therethrough. Alternatively, two valve orifices can be utilized in each push valve 12, 16, each with a diameter in the range of 0.010 inches to 0.040 inches, and preferably 0.020 inches. Preferably, chambers 10, 14 are made from draw-formed aluminum to minimize the number of seams.

An inert material is applied to the inside surface of chambers 10, 14 to physically separate the contents from the chamber surface. Reactions of peroxygen compounds with metal ions can produce gas that may undesirably increase the pressure inside the chamber. Furthermore, any reaction that may occur inside the chamber decreases the cleaning capability of the system because less active ingredient is available at the time of use. The preferred separator is applied on the surfaces of the chamber and some of the valve components that come in contact with the contents and is made from an inert polymer that is resistant to attack by peroxygen compositions and aerosol mixtures. Suitable commercially available products include epoxy phenolics such as Epon, polyamide-imides such as Pamasol, both available from Courtaulds Coatings, and vinyl organisols such as Micoflex available from Dexter International Corporation. In an alternate embodiment, the separator is a polyethylene or polypropylene bag or laminate that is sealed at the chamber outlet openings 12, 16. In another alternate embodiment, the separator is a laminate applied to the chamber surfaces and comprises inert materials such as polyethyleneterephthalate (PET) or polypropylene. In yet another alternative, the separator is formed by anodizing the interior surface of the aluminum chamber. Steel or tin-plated steel can be used as an alternative to aluminum; however, a separator as previously described is required due to the high reactivity of ferrous ions with peroxygen compositions.

A dispensing head 36 has at a lower portion thereof a retaining skirt 38, which is adapted to releasably retain aerosol chambers 10 and 14. The dispensing head 36 further has a grip 40 that extends upwardly from the retaining skirt 38 and forms a hand grip for the user of the dispenser. A head 42 is connected to the top of the grip 40 and has a spray nozzle 44 at one end thereof. A cam trigger 28 is mounted to the grip 40 beneath the head 42.

As illustrated in FIG. 2, the skirt 38 mounts a pressure plate 18 for vertical reciprocatory movement therein. The pressure plate 18 has openings 46 and 48 in register with the push valves 12 and 16, respectively. The openings 46 and 48 are connected through tubes 22 and 24 to a mixing tube 26 that terminates in the spray nozzle 44. The cam trigger 28 is pivotally mounted to the grip 40 through a pivot pin 30. The cam trigger 28 has a lower cam surface 50 that interfaces with a cam follower 20.

As the cam trigger 28 is squeezed inwardly, it forces the cam follower 20 and, thus, the pressure plate 18 downwardly to simultaneously open the push valves 12 and 16. Thus, equal amounts of the solution in the aerosol chambers 10 and 14 are simultaneously dispensed through the tubes 22 and 24 respectively and into the mixing tube 26. The mixed solutions are sprayed through the spray nozzle 44 on to a surface to be cleaned.

Figure 3:
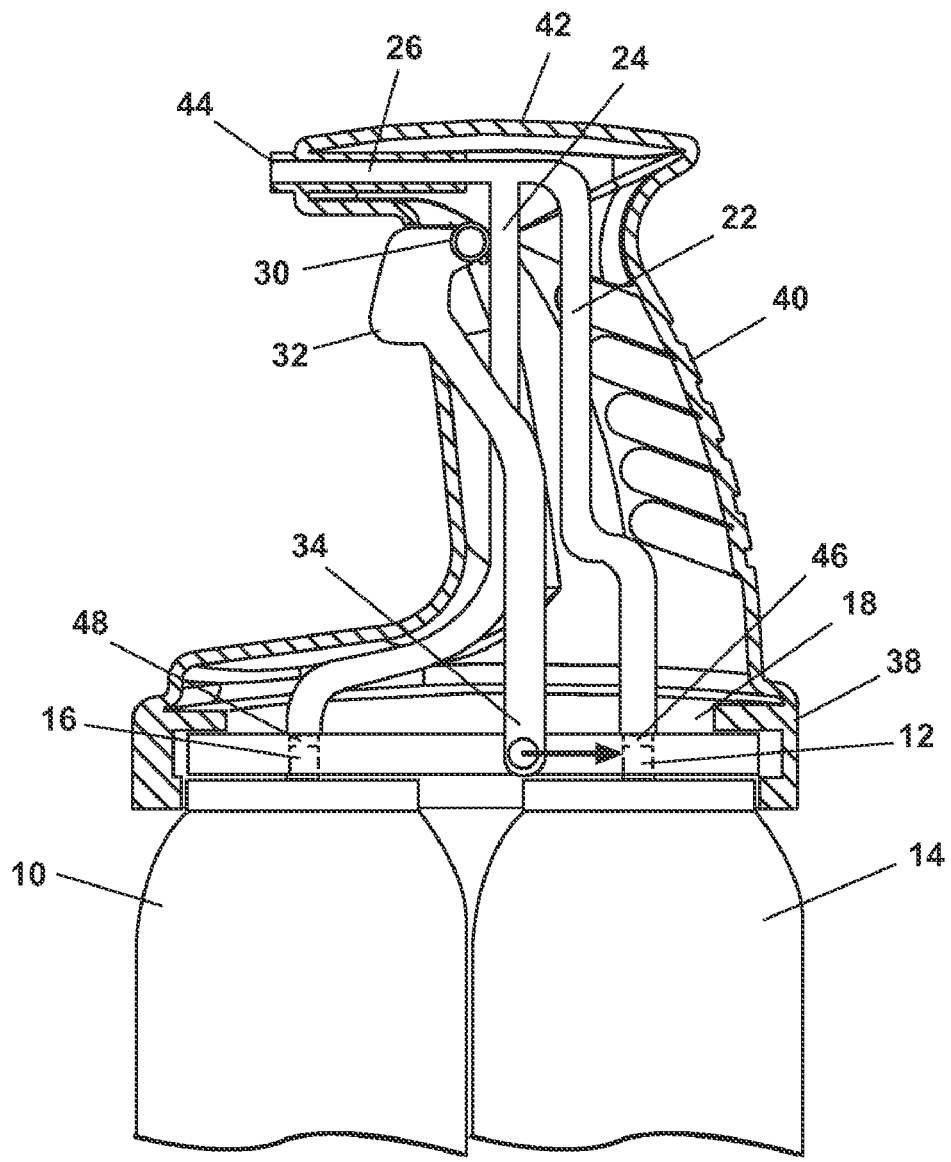
FIG. 3 is a sectional view, like FIG. 2, of modified form of a dual aerosol dispenser according to the invention.
Figure 4:
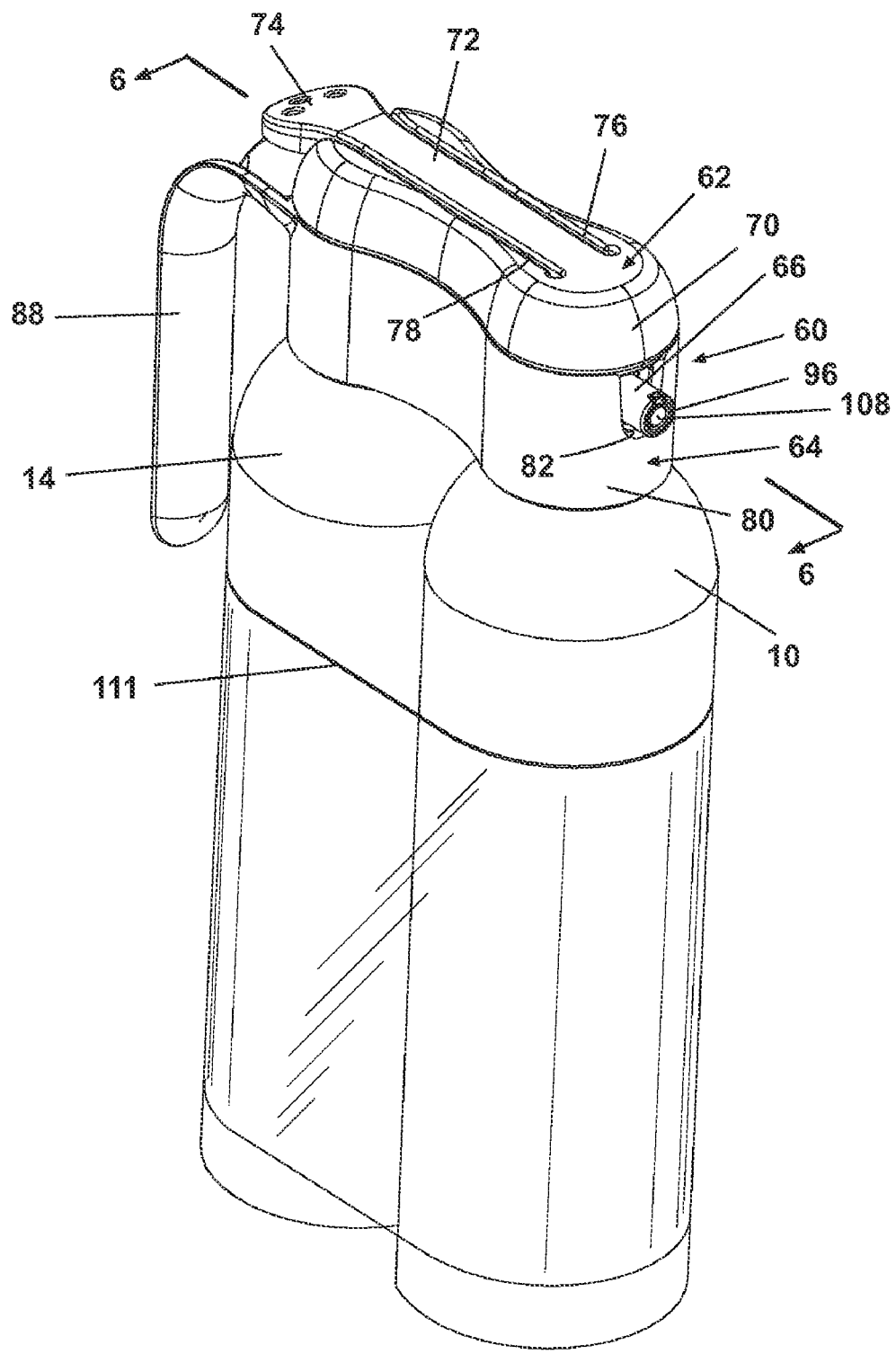
FIG. 4 is a perspective view of an alternative embodiment of an aerosol dispenser according to the invention.

Referring now to FIG. 3, where like numerals have been used to designate like parts, the pressure plate 18 is mounted for horizontal translational movement with respect to the skirt 38. The cam trigger 32 has a cam finger 34, which is pivotally mounted to the pressure plate 18. Thus, as the cam trigger 32 is squeezed and rotates about the pivot pin 30, the pressure plate 18 will be translated horizontally and to the right as viewed in FIG. 3 to open the valves 12 and 16. In this manner, predetermined proportions of solutions in the aerosol chambers 10 and 14 are simultaneously dispensed through the tubes 22 and 24 respectively, and into the mixing tube 26 from which the mixture is dispensed through the spray nozzle 44.

Referring now to FIGS. 4 through 9, there is shown an alternative embodiment of an aerosol dispenser 60 comprising a push valve assembly 110 for each chamber 10, 14, an actuator top 62, a handle base 64, and a dispensing tube 66. Aerosol chambers 10 and 14 are releasably mounted within the handle base 64.

Figure 6:
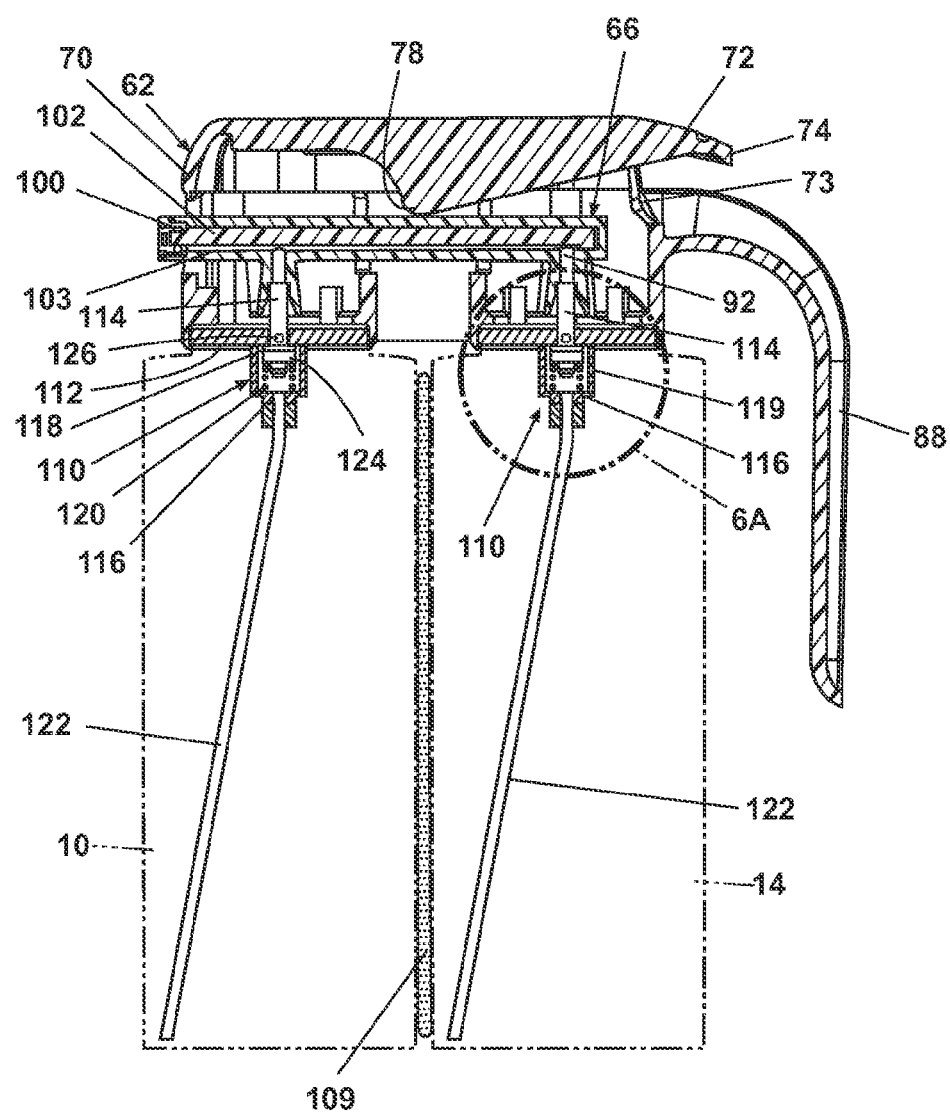
FIG. 6 is a sectional view of the aerosol dispenser illustrated in FIG. 4 taken along line 6-6 of FIG. 4.
Figure 6A:
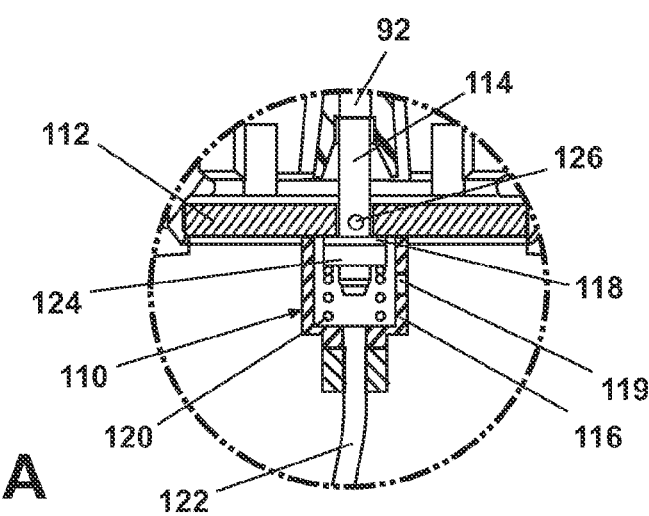

As depicted in FIG. 6, the push valve assembly 110 comprises a valve cup 112, a stem 114, a housing 116, a gasket 118, a spring 120, and a dip tube 122. The valve cup 112 has an annular lip sized to receive chamber 10 or 14. Further, the center of the valve cup 112 has an opening 126 therethrough. Preferably, the valve cup 112 is formed of the same material as the chambers 10, 14 and lined with a suitable separator material as described above for the chambers. Specifically, the chamber 10, 14 and valve cup 112 are made of the same material type and preferably are comprised of aluminum. Alternatively, these components can be made of steel or tin-plated steel. Valve cup 112 may optionally comprise a separator, or liner, as described above. The valve stem 114 has a solid lower end, a hollow upper end, a reduced diameter section therebetween, and preferably one, and optionally two, valve orifices located in the side that are in fluid communication with the hollow upper end. The valve stem 114 is received in the opening 126 of the valve cup 112, with the gasket 118 located between the solid lower end of the stem 114 and the cup 112. The housing 116 has a hollow cylindrical upper portion, a reduced diameter hollow lower portion, and a flange therebetween. The housing 116 surrounds the stem 114, abuts the gasket 118 at its upper end, and is secured in place by the valve cup 112. Inside the housing 116, the spring 120 is positioned between the lower end of the stem 114 and the flange of the housing 116 and biases the stem 114 such that the valve orifices are positioned at or above the gasket 118. The hollow dip tube 122 is connected to and in fluid communication with the lower portion of the housing 116 and extends to the bottom of the chamber 10 or 14.

The stem 114 and the housing 116 are made from nylon or polypropylene depending upon the propellant used and the nature of the composition. In the cleaner composition, any propellant may be used and nylon is the preferred material for the stem 114 and housing 116. In the peroxygen container, nylon is preferred when HFC is the aerosol propellant. Polypropylene may be used when any propellant other than HFC is utilized. The gasket 118 is preferably formed from a resilient material, such as Buna-Nitrile (Buna-N) or Butyl, common gasket materials used in the aerosol dispenser industry. The spring 120 and the dip tube 122 are preferably composed of stainless steel and polyethylene, respectively. The invention should not be limited to type of push valve assembly 110 described herein, and other push valves well known to those skilled in the art can be utilized with the aerosol dispenser.

The actuator top 62 has a cover housing 70 with an integrally formed actuator finger 72 and a thumb tab 74. The actuator finger 72 is separated along its sides by slots 76, has cam levers 78 that extend downward therefrom, and is resiliently cantilevered from a front portion of the cover housing 70. The actuator top 62 is formed from a resilient plastic material, preferably by injection molding.

Figure 5:
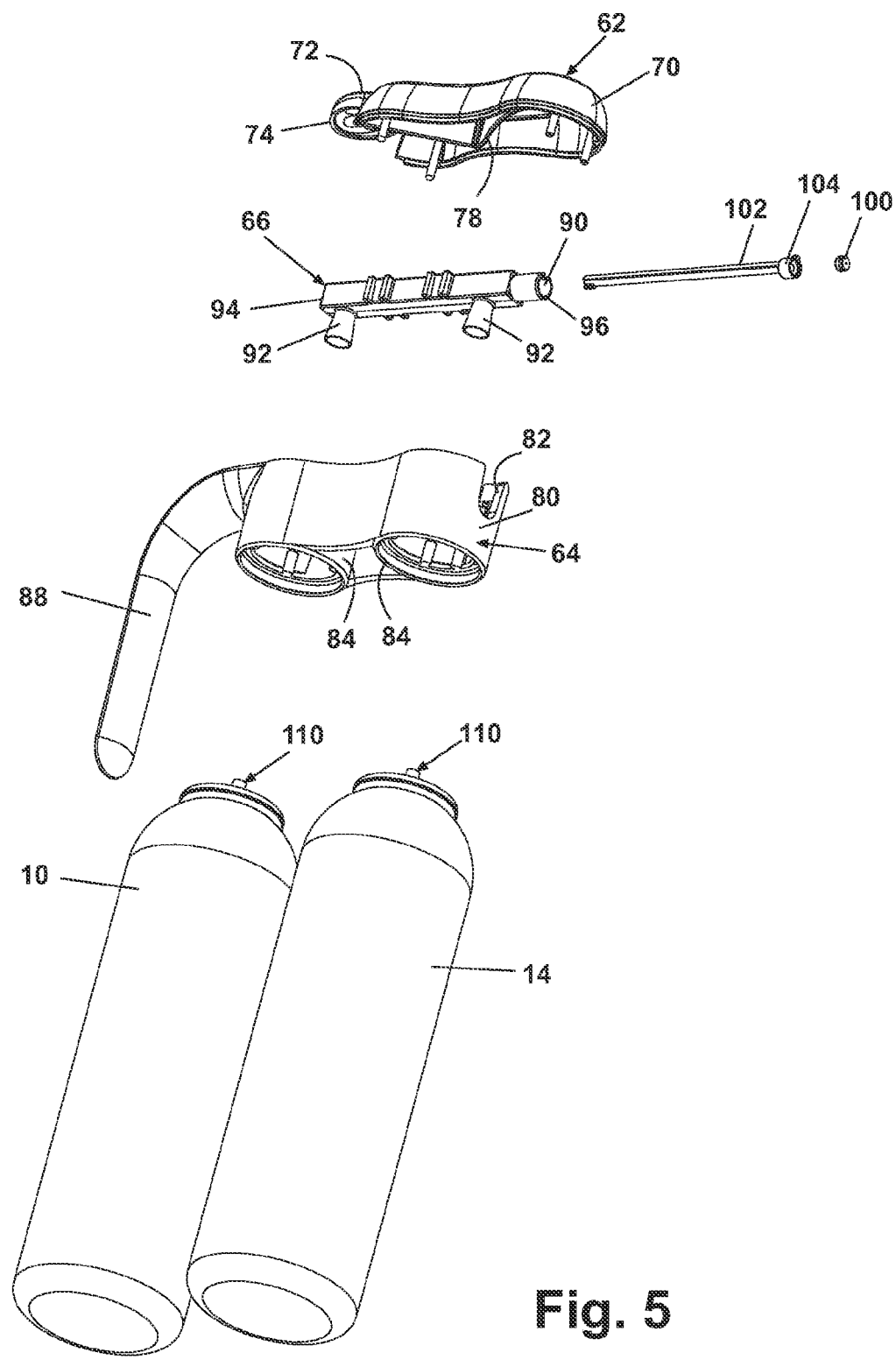
FIG. 5 is an exploded view of the aerosol dispenser illustrated in FIG. 4.

The handle base 64, best shown in FIG. 5, comprises an outer wall 80 having a slot 82 at one end in which is mounted the end of the dispensing tube 66. The handle base 64 further comprises a pair of arcuate inner walls 84, which with outer wall 80 forms cylindrical sockets for the aerosol chambers 10 and 14. The arcuate inner walls 84 each have a vertical slot extending from a top portion substantially identical with the slot 82 in the outer wall 80. A handle 88 is integrally formed with the outer wall 80 and is designed so that a user can grip the handle 88 with his or her hand and apply thumb pressure at thumb tab 74 to the actuator finger 72. An integral lock (not shown) can be formed on an outer end of the actuator finger 72 and project downwardly thereof to abut the handle 88 and prevent depression of the actuator finger 72 prior to sale and use of the dispenser. The integral lock can be attached to the handle 88 with a frangible connection and thus easily removed when it is desirable to dispense the contents of the aerosol chambers 10 and 14.

Figure 7:
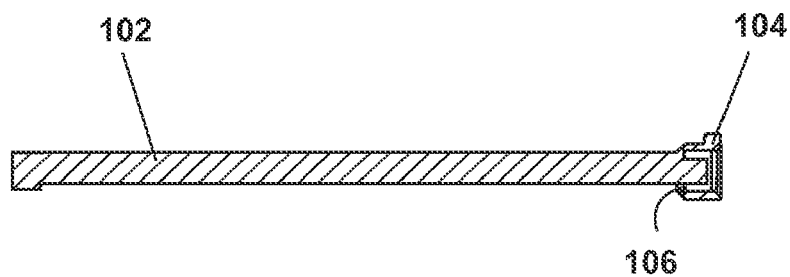
FIG. 7 is a sectional view of a hollow conduit insert illustrated in FIG. 5.
Figures 8, 9:
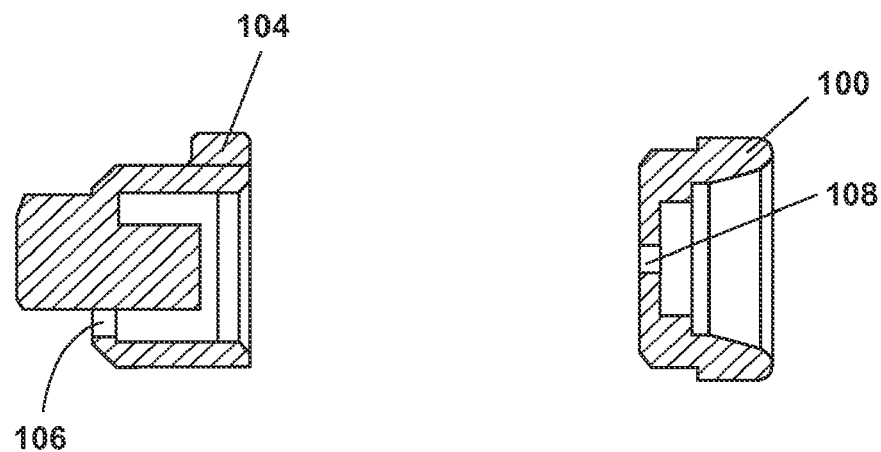
FIG. 8 is a sectional view of a mechanical breakup plug of the hollow conduit insert illustrated in FIG. 5.
FIG. 9 is a sectional view of a terminal orifice of the hollow conduit insert illustrated in FIG. 5.

Referring to FIGS. 5-9, the dispensing tube 66, preferably formed from polypropylene, comprises connecting tubes 92 in fluid communication with the interior of a hollow conduit 90 having a closed end 94 and a nozzle end 96. The connecting tubes 92 have an open lower end sized to receive the hollow upper end of the valve stem 114. Dispensing tube 66 further comprises a hollow conduit insert 102. Hollow conduit insert 102 is a rod shaped structure that fits tightly against an upper wall of the hollow conduit 90 but leaves a cavity 103 of a predetermined volume at a lower wall of the hollow conduit 90. The cavity is in fluid communication with connecting tubes 92 and, therefore, with the hollow upper end of the valve stem 114. A mechanical breakup plug 104, best seen in FIGS. 7 and 8, is located on one end of the conduit insert 102 and forms a part of the nozzle end 96. A spray aperture 106 of a predetermined size is formed at a lower portion of the mechanical breakup plug 104 and aligned with the cavity 103.

A terminal orifice 100, best seen in FIG. 9, is fixedly attached to the mechanical breakup plug 104 and comprises an at least one generally circular terminal aperture 108, preferably having a diameter in the range of 0.020 to 0.040 inches, therethrough that is in fluid communication with the spray aperture 106 and, therefore, the cavity 103 and the connecting tubes 92. The mechanical breakup plug and the terminal orifice force a disrupted flow pattern at the nozzle end 96 of the hollow conduit 90 wherein the contents are mixed and delivered under pressure to the surface to be cleaned.

The sealed and pressurized chamber is capable of containing excessive pressure created if the oxidant should come in contact with a reactant inside the chamber, such as flaws in the separator material, contact with an activator, or trace contaminants in the compounding solvents. The chamber is designed to an aerosol industry standard 18 bar strength level to provide an adequate safety margin. In the preferred embodiment, the chamber buckle strength is no less than 250 psi and the burst strength no less than 320 psi.

In operation, the aerosol chambers 10 and 14 are equipped with the push valve assemblies 110 by attaching the cups 112 thereto and are releasably mounted within the outer walls 80 of the aerosol dispenser 60 so that the valve stems 114 are seated within the open outer end of the connecting tubes 92. The dispensing tube 66 fits within the slots 82 in the outer wall 80 and within the slots 86 in the arcuate inner walls 84 for vertical reciprocatory movement therein. The top surface of the dispensing tube 66 abuts the underside of the cam levers 78. When a user grips the handle 88 and depresses the actuator finger 72 through thumb pressure at the thumb tab 74, the cam levers 78 are driven downwardly with respect to the handle base 64 to thereby depress the valve stems 114 and the springs 120 so that the valve orifices in the stems 114 are positioned below the gasket 118. In this configuration, the valve orifices are in fluid communication with the housing 116 and the dip tube 122. As a result, the contents of the aerosol chamber are respectively dispensed in equal proportion through the push valve assembly 100 via the dip tube 122, the housing 116, the valve orifices, and the hollow upper end of the stem 114; through the connecting tubes 92; through the cavity 103 of the hollow conduit 90; through the spray aperture 106 of the mechanical breakup plug 104, and through the terminal aperture 108. The pressure in the aerosol chambers 10 and 14 forces the mixture of cleaning solution and oxidizing solution through the terminal aperture 108 in a spray pattern to spray on a carpet or fabric surface. When the pressure on the actuator finger 72 is released, the dispensing tube 66 rises in the slots 82 and 86 under spring pressure from the push valve assemblies 110 to cease the flow of the cleaning composition and the oxidizing composition from the aerosol chambers 10 and 14.

The proper combination of valve orifice size, cavity 103, terminal aperture 108 size, and propellant pressure are required to achieve the desired ratio and flow rate of cleaning compositions and oxidants and spray pattern for a given distance from the surface to be cleaned. Preferably, a 1:1 ratio of cleaning composition and oxidant is dispensed at a flow rate of 3-8 grams per second, preferably 5 grams per second, in a circular spray pattern having a diameter less than 2 inches when the chambers 10, 14 are 2 feet away from the target surface.

A fabric/carpet cleaning formula composition for removing stains and soil from carpets and fabrics such as upholstery fabrics is filled into one of the aerosol chambers. This composition includes one or more cleaning solvents, a surfactant, de-ionized water and, optionally, a fragrance. According to the invention, the cleaning composition further includes a pH adjusting agent to maintain a pH in the cleaning solution between 7.5 and 12.0 in order to trigger release of oxygen in the oxidizing composition. The cleaning composition can also include an anti-stain and/or anti-resoil agent. An example of the anti-stain protectant is PM 1874, a sulfo-methacrylate resin, manufactured by the 3M Company. An example of the anti-soil component is PM 1870, a polysiloxane derivative in the silsesquioxane chemical family, also manufactured by the 3M Company. Other components may include acrylic polymers.

De-ionized water is preferred as the solvent medium for the cleaning composition. The de-ionized water minimizes contamination of the cleaning solution from trace minerals in the water. One advantage of using de-ionized water as a solvent is that it evaporates with little or no residue after delivering cleaning agents to the carpet or upholstery. Alternative cleaning solvents can be one or more glycol ethers, for example dipropylene glycol monomethyl ether, or Glycol Ether DPM, and propylene glycol normal propyl ether, Glycol Ether PNP, or one of the terpenes such as natural terpenes including d-limonene. These components can be present in the cleaning composition in effective amounts. For example, the Glycol Ether DPM can be present in the range of 0.5 to 1.5, preferably 0.8 wt. % in the composition. Glycol Ether PNP can be present in the range of 0.8-15.0, preferably 7.2 wt. %. D-limonene, when used, can be present in the range of 0.1 to 5.0, preferably 0.3 wt. % in the composition.

Non-ionic surfactants can be present in a range of about 0.1 to 2.0. Tomadol 23-6.5, a non-ionic surfactant comprising ethylene oxide attached to lineal alcohol, is preferably present at about 0.8 wt. %. Alternatively, Neodol 23-6.5, another alcohol ether, can be present at about 1.8 wt. %.

The EDTA can be present in amounts between about 0.1 and 5.0, preferably 0.4 wt %, in compositions that include 40% EDTA solution.

In the aerosol propelled composition embodiment, the propellant for both chambers is preferably dimethyl ether ($C_2H_6O$, also known as DME). An alternative propellant can be the hydrofluorocarbon (HFC) family, particularly 1,1-difluoroethane ($CH_3CHF_2$). A suitable commercially available HFC is Dymel 152A from Dupont. The concentration of Dymel 152A in the cleaning composition can be in the range of 1%-25% by weight and preferably 5%. Yet other alternative propellants include hydrocarbons such as isobutane ($C_4H_{10}$), propane ($C_3H_8$), and liquefied petroleum gas; and natural gases including compressed air, carbon dioxide, and nitrogen.

Pressurization within the cleaning composition chamber can range from 1 to 100 pounds per square inch (psi). When DME is the propellant, dual 0.020 inch push valve orifices and an internal pressure of 45 psi are preferred. When a HFC propellant is used, a single 0.020 inch orifice is employed at an internal pressure of 70 psi.

The pH adjusting agent is also used to remove trace amounts of iron and other contaminates. A typical pH agent is EDTA (ethyleneditetramine). Other suitable pH agents include disodium EDTA, an example of which is Hampene Na2.

The cleaning composition can further include an activator for the oxidizing composition. The preferred activator is sodium carbonate, however, other suitable activators include metals ions, metals salts, and other carbonates such as sodium bicarbonate. Still other suitable activators include tetraacetylethylenediamine, sodium octanoyloxybenzene sulfonate, sodium nonanoyloxybenzene sulfonate, sodium decanoyloxybenzene sulfonate, (6-octanamido-caproyl)oxybenzenesulfonate, (6-nonanamido-caproyl)oxybenzenesulfonate, 6-decanamido-caproyl) oxybenzenesulfonate, and mixtures thereof. In the preferred embodiment, sodium carbonate can be added as an activator in an amount of at least 0.1 wt. % and preferably 0.5 wt. % to reach a stoichiometric ratio of activator to reactant.

The cleaning composition can also include anionic surfactants that create a friable residue that can be vacuumed after the cleaning process. A suitable anionic surfactant is sodium lauroyl sarcosinate, such as Hamposyl L-30 Type 724, and can be present in suitable amounts, for example between 1.0 and 6.0, preferably 3.3 wt. %.

In addition to the foregoing, the cleaning composition can further include a dispersant for soil and a further pH stabilizer such as Alcosperse 602N, which is an acrylate polymer.

The oxidizing composition is filled into the other aerosol chamber and includes de-ionized water, a peroxygen compound, a stabilizer and, optionally, anti-soil and/or anti-stain protectants. An example of the anti-stain protectant is PM 1874, manufactured by the 3M Company. An example of the anti-soil component is PM 1870 from the silsesquioxane chemical family, also manufactured by the 3M Company. Other components may include acrylic polymers. Suitable soil-resist or anti-soil compositions are disclosed in the U.S. Pat. No. 5,888,290, which is incorporated herein by reference.

The de-ionized water in the oxidizing solution is present in a range of about 70 to about 99 wt. %, preferably about 88.3 wt. %. De-ionized water is important in the oxidizing solution to minimize contaminants that will initiate activation inside the chamber, reducing the cleaning efficacy of the composition and creating an undesirable increase in internal pressure. The peroxygen compound can be present in a range of about 0.4% to 29%, preferably 11.4%, of the active ingredients resulting in a total fill concentration of about 0.1%-10% by weight with a preferred value of about 4 wt. %.

The peroxygen compound is preferably a cosmetic grade hydrogen peroxide ($H_2O_2$), however other peroxygen compounds can be used. A suitable commercially available 35% cosmetic grade hydrogen peroxide is available from the Degussa Company and is preferred because of its superior stability characteristics and extended shelf life. Other suitable hydrogen peroxides are available from Solvay Interox. Yet another suitable hydrogen peroxide is provided by FMC Industrial Chemicals under the trade names Hybrite 32.5%, Durox, Oxypure 35%, Standard 27.5 35%, Super D 25 and 35, Technical 35%, Chlorate Grade 20%, Semiconductor Reg, Seg, RGS, RGS 2, RGS 2, 31%. Alternatively, the peroxygen compound can be a preformed peracid compound selected from the group consisting of percarboxylic acid and salts, percarbonic acids and salts, perimidic acids and salts, peroxymonosulfuric acids and salts, and mixtures thereof; a persalt such as perborate compounds, percarbonate compounds, perphosphate compounds and mixtures thereof; or a peroxide compound.

The anti-stain ingredient in the oxidizing solution can be present in about 1 to 5 wt. %, typically about 1.7 wt. %. The anti-soil ingredient is typically present in less than 1% by weight, typically about 0.3 wt. % in the composition.

The pH stabilizer will maintain the oxidizing composition at a pH level in the range of 1.5 to 8.5, preferably about 6.8. Pentasodium diethylenetriamine pentaacetate, for example Versenex 80, is an appropriate pH stabilizer when oxidative conditions exist. It will also neutralize any trace elements of contaminates in the oxidizing composition.

The aerosol propellant for the oxidizing composition is preferably dimethyl ether ($C_2H_6O$, also known as DME). Alternative propellants may be chosen from the hydrofluorocarbon (HFC) family, hydrocarbons, and natural gasses. A suitable HFC is 1,1-difluoroethane ($CH_3CHF_2$), commercially available as Dymel 152A from Dupont. The concentration of Dymel 152A in the oxidizing composition can be in the range of 1%-25% by weight, preferably 5%. A particularly suitable hydrocarbon is N-Butane ($C_4H_{10}$). Alternative hydrocarbon materials include isobutane ($C_4H_{10}$), propane ($C_3H_8$), and liquefied petroleum gas. Natural gases include compressed air, carbon dioxide, and nitrogen.

Pressurization within the oxidizing chamber can range from 1 to 100 pounds per square inch (psi). When DME is the propellant, a single 0.020 inch orifice is preferred at a preferred pressure of about 45 psi. Alternatively, dual 0.020 inch orifices can be employed with DME. When HFC is the propellant, a single valve orifice of 0.018 inches is used and the preferred pressure is about 70 psi.

The pH values of the cleaning composition and the oxidizing composition can vary over a wide range but are selected, taking into consideration the volume of each composition that is dispensed simultaneously, so that the pH of the combined cleaning composition and the oxidizing composition is sufficiently greater than 7 to activate the discharge of oxygen from the oxidizing solution for enhanced cleaning of the carpet surface. In a preferred embodiment the pH is the combined cleaning composition and the cleaning composition is greater than 8, preferably about 8.3.

EXAMPLES

Spot cleaning compositions were prepared with the following ingredients in Table 1:

TABLE 1

| CLEANING COMPOSITIONS | | | | | | | | |
|---|---|---|---|---|---|---|---|---|
| INGREDIENTS | A | E | B | F | G | C | D | H |
| Deionized Water | 83.40 | 83.67 | 82.90 | 83.40 | 83.50 | 83.80 | 90.80 | 89.35 |
| Sodium Carbonate | 0.50 | 0.40 | 0.50 | 0.50 | 0.50 | | | |
| Dowanol PNP[1] | 15.00 | 15.00 | 14.70 | 15.00 | 14.80 | 15.00 | | |
| Fragrance[2] | 0.10 | 0.10 | | | | 0.10 | 0.10 | 0.05 |
| Tomadol 23-6.5[3] | 0.80 | 0.66 | 0.80 | 0.66 | 0.80 | 0.60 | 0.70 | |
| Petro ULF[4] | 0.20 | 0.17 | 0.80 | 0.34 | 0.20 | | | |
| d-limonene | | | 0.30 | 0.10 | 0.30 | | | |
| EDTA, 40% | | | | | | 0.40 | 0.40 | |
| Glycol Ether DPM | | | | | | | 0.80 | 0.50 |
| Glycol Ether PNP | | | | | | | 7.20 | 4.50 |
| Hampene Na2[5] | | | | | | | | 0.50 |
| Neodol 23-6.5[6] | | | | | | | | 1.80 |
| Hamposyl L-30 Type 724[7] | | | | | | | | 3.30 |
| Alcosperse 602N[8] | | | | | | | | |
| INGREDIENTS | I | L | J | K | M | O | N | P |
| Deionized Water | 88.85 | 85.80 | 82.90 | 82.90 | 87.00 | 89.70 | 89.9 | 90.80 |
| Sodium Carbonate | | | | | | | | |
| Dowanol PNP[1] | | | | | | | | |
| Fragrance[2] | 0.05 | 0.10 | 0.10 | 0.10 | 0.10 | 0.10 | 0.10 | 0.10 |
| Tomadol 23-6.5[3] | | | | | | | | |

TABLE 1-continued

CLEANING COMPOSITIONS

| | | | | | | | | |
|---|---|---|---|---|---|---|---|---|
| Petro ULF[4] | | | | | | | | |
| d-limonene | | | | | | | | |
| EDTA, 40% | | | | | | | 0.50 | 0.40 |
| Glycol Ether DPM | 0.50 | 0.80 | 1.50 | | 7.20 | 0.80 | 7.20 | 0.80 |
| Glycol Ether PNP | 4.50 | 7.20 | 13.50 | 15.00 | 0.80 | 7.20 | 0.80 | 7.20 |
| Hampene Na2[5] | | | | | | | | |
| Neodol 23-6.5[6] | 1.80 | 1.80 | 1.00 | 1.00 | 0.40 | 0.70 | 0.50 | 0.70 |
| Hamposyl L-30 Type 724[7] | 3.30 | 3.30 | | | 3.00 | | 1.00 | |
| Alcosperse 602N[8] | 1.00 | 1.00 | 1.00 | 1.00 | 1.50 | 1.50 | | |

[1]Glycol ether, a solvent, manufactured by Dow Chemical Company
[2]Sapphire fragrance, manufactured by Firmenich
[3]Linear primary alcohol ethoxylate, a non-ionic surfactant, manufactured by Tomah Chemical Company
[4]Sodium alkyl napthelene sulfonate from AKZO Nobel
[5]Disodium EDTA, manufactured by Hampshire Chemical
[6]Alcohol ether, a non-ionic surfactant, manufactured by Shell Chemicals
[7]Sodium lauroyl sarcosinate, an anionic surfactant, manufactured by Hampshire Chemical
[8]Acrylate polymer, a pH stabilizer, manufactured by Alco Chemical For all of the samples, the pH of the cleaning composition was 11.3±0.3.

The compositions of the oxidizing solutions were as follows in Table 2:

TABLE 2

OXIDIZING SOLUTIONS

| INGREDIENTS | A | B | C |
|---|---|---|---|
| Deionized Water | 88.30 | 77.70 | 79.70 |
| Hydrogen Peroxide, Cosmetic Grade 35% | 11.40 | 20.00 | 20.00 |
| Versenex 80[1] | 0.30 | 0.30 | 0.30 |
| PM 1874[2] | | 1.70 | |
| PM 1870[3] | | 0.30 | |

[1]Pentasodium diethylenetriamine pentaacetate, a pH stabilizer, manufactured by Dow Chemical Company
[2]Sulfo-methacrylic polymer, an anti-stain protectants, manufactured by the 3M Company
[3]Polysilosane derivative, an anti-soil ingredient, manufactured by the 3M Company For all of the samples, the pH of the oxidizing solution was 6.8±0.3.

Any of the cleaning compositions may be combined with any of the oxidizing solutions to achieve acceptable cleaning results. The preferred combinations are shown in Table 3. Although any combination of cleaner and oxidizer will result in acceptable results, each combination exhibits different characteristics. From a chemistry perspective, the technically superior result is a combination of cleaner A and oxidizer A. However, when cost of ingredients is taken into account, cleaner C combined with oxidizer A is the best choice for consumer value. The best cleaning performance was exhibited by cleaner A combined with oxidizer C, and the best protection was provided by cleaner A combined with oxidizer B.

TABLE 3

PREFERRED COMBINATIONS

| COMPOSITION | TECHNICALLY SUPERIOR | SUPERIOR CLEANER | SUPERIOR PROTECTION | MARKET CHOICE |
|---|---|---|---|---|
| Cleaning Composition | A | A | A | C |
| Oxidizing Solution | A | C | B | A |

The pH of the combined cleaning composition and oxidizing solution as expelled for all samples was 8.3±0.3.

Test Method

Two separate chambers were partially filled with the carpet cleaning solution and the oxidizing solution. The chambers were then partially filled with an aerosol propellant. The two compositions were then dispensed through a common spray nozzle onto carpet samples that had been pretreated with stains from red wine, grape juice, spaghetti sauce, chocolate syrup, red lipstick, and blue ballpoint pen ink. The carpets were scrubbed moderately with a brush and then were vacuumed with a suction cleaner to remove the soiled solution. Cleaning was measured using a calibrated spectrophotometer on the stain at both the front and back of the carpet sample. Results were calculated as $\Delta E$, the difference in spectrophotometer readings from the clean, virgin carpet and the carpet after the stain was removed ($\Delta E$=virgin reading−cleaned reading). The lower the $\Delta E$ value, the less stain remains. The stains were satisfactorily removed. The average results for each stain for the preferred combination of cleaner C and oxidizer A (Market Choice from Table 3) are presented in Table 4.

TABLE 4

RESULTS OF SIGNIFICANT OUTCOMES FOR MARKET CHOICE

| STAIN | $\Delta E$ VALUE |
|---|---|
| Grape Juice | 2.97 |
| Koolaid (Cherry) | 8.03 |
| Coffee | 5.99 |
| Red Wine | 3.72 |
| Cola | 1.59 |
| Lipstick (Red) | 15.97 |
| Spaghetti | 13.67 |
| Black Ink | 44.25 |
| Dirty Motor Oil | 21.26 |
| Chocolate Syrup | 27.27 |

Whereas the invention has been described with respect to an aerosol dispensing package for the cleaning solution and oxidizing solution, many other delivery forms can be used. For example, a dual siphon manual trigger dispenser having a fixed or variable ratio can be used. Such manual trigger dispensers are disclosed in U.S. Pat. Nos. 5,332,157, 4,862,052, 4,821,923 and 4,432,469, all of which are incorporated herein by reference.

The cleaning solution and oxidizing solution can be dispensed from separate squeeze chambers. For example, a dual chamber blow molded bottle, such as disclosed in U.S. Pat. No. 5,676,055, 4,835,804, 4,776,972 or 4,720,351 can be used.

The trigger can be battery powered as well as being manual. It can have a fixed or variable ratio.

Another alternative chamber and dispensing system for the cleaning composition and oxidizing compositions according to the invention is a dual chamber squeeze bottle as, for example disclosed in U.S. Pat. No. 4,585,149 or 6,216,915, both of which patents are incorporated herein by reference.

Anti-stain compositions according to the invention are disclosed in U.S. Pat. No. 5,948,480. Anti-soil compositions used in the invention are disclosed in U.S. Pat. Nos. 6,043,209, 5,534,167, 5,888,290, all of which are enclosed herewith by reference.

Still further, the cleaning and/or oxidizing solution can themselves contain components which, when mixed, generate heat so that the cleaning and oxidizing solution applied to a surface are applied at elevated temperatures. Examples of compositions and systems for generating heat in the cleaning and/or oxidizing solutions are disclosed in U.S. Publication No. US-2003-0075203-A1, which was published on Apr. 24, 2003, and is incorporated herein by reference.

Reasonable variation and modification are possible within the forgoing disclosure and drawings without departing from the spirit of the invention that is defined in the appended claims.

We claim:

1. A kit for removing dirt and stains from fabrics and carpets comprising:
    a cleaning composition comprising at least one polysiloxane-based anti-soil agent and at least one methacrylate-based anti-stain agent;
    an oxidizing composition that enhances the cleanability of the cleaning composition; and
    a container having:
        a first chamber;
        a second chamber; and
        a dispensing system having a single dispensing spray outlet for dispensing controlled amounts of fluids from each of the first and second chambers;
    wherein the cleaning composition is stored in one of the first and second chambers and the oxidizing composition is stored in the other of the first and second chambers, and
    wherein the dispensing system is configured to simultaneously dispense the cleaning composition and the oxidizing composition from their respective chambers, mix the cleaning composition and the oxidizing compositions together, and dispense a mixture of the cleaning composition and the oxidizing composition from the container.

2. A kit according to claim 1 wherein the dispensing system is adapted to mix the cleaning composition and the oxidizing composition together at least one of in the single dispensing spray outlet before they are sprayed from the dispensing spray outlet and at a surface of the fabric or carpet after they are sprayed from the dispensing spray outlet.

3. A kit according to claim 1 wherein the dispensing system includes at least one of aerosol propellants in each of the first and second chambers to pressurize the fluid in each of the first and second chambers and a mechanical pump for drawing fluid from each of the first and second chambers for dispensing the cleaning composition and the oxidizing composition from their respective first and second chambers.

4. A kit according to claim 1 wherein the cleaning composition further comprises at least one of a surfactant, a fragrance and combinations thereof and the oxidizing composition comprises at least one of deionized water, a peroxide compound, a stabilizer, an anti-soil agent, an anti-stain agent and combinations thereof.

5. A kit according to claim 4 wherein the cleaning composition further includes a pH adjusting agent to maintain a pH in the cleaning composition between 7.5 and 12.0 in order to trigger release of oxygen in the oxidizing composition.

6. A kit according to claim 5 wherein the pH of oxidizing composition is in the range of about 1.5 to about 8.5.

7. A kit according to claim 1 wherein the oxidizing composition comprises hydrogen peroxide.

8. A kit according to claim 1 wherein each of the first and second chambers further comprises an aerosol propellant, an outlet with a valve assembly to control a flow of fluid through the outlet, and a dip tube connected to the valve assembly for dispensing fluid under pressure from each of the first and second chambers.

9. A kit according to claim 8 wherein the one of the first and second chambers storing the oxidizing composition is made from one of aluminum, steel and zinc-plated steel and has a coating of a material inert to a peroxide compound in the oxidizing composition on an inner wall of the one of the first and second chambers that is in contact with the oxidizing composition.

10. A kit according to claim 8 wherein the one of the first and second chamber storing the oxidizing composition is formed in part by a cup, and the outlet for the one of the first and second chambers is positioned in the cup, and the cup is formed of at least one of aluminum, steel and zinc-plated steel and has a coating of a material inert to a peroxide compound in the oxidizing composition.

11. A kit according to claim 8 wherein the aerosol propellant for the one of the first and second chambers storing the oxidizing composition is a fluorinated hydrocarbon and the aerosol propellant for the other of the first and second chambers storing the cleaning composition is dimethyl ether and the valves for the first and second chambers have at least one orifice.

12. A kit according to claim 1 wherein the cleaning composition further comprises at least one organic solvent selected from the group consisting essentially of glycol ethers, terpenes and mixtures thereof.

* * * * *